United States Patent
Wentink et al.

(10) Patent No.: US 10,104,553 B2
(45) Date of Patent: Oct. 16, 2018

(54) PROTECTED CONTROL FRAMES

(71) Applicant: QUALCOMM Incorporated, San Diego, CA (US)

(72) Inventors: Maarten Menzo Wentink, Naarden (NL); Alfred Asterjadhi, San Diego, CA (US); Jouni Kalevi Malinen, Tuusula (FI)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/474,658

(22) Filed: Mar. 30, 2017

(65) Prior Publication Data

US 2017/0208472 A1    Jul. 20, 2017

Related U.S. Application Data

(62) Division of application No. 14/207,194, filed on Mar. 12, 2014, now Pat. No. 9,614,935.
(Continued)

(51) Int. Cl.
*H04W 4/00* (2018.01)
*H04W 12/10* (2009.01)
(Continued)

(52) U.S. Cl.
CPC .............. *H04W 12/10* (2013.01); *H04L 1/00* (2013.01); *H04L 1/1607* (2013.01);
(Continued)

(58) Field of Classification Search
None
See application file for complete search history.

(56) References Cited

U.S. PATENT DOCUMENTS 6,674,738 B1    1/2004  Yildiz et al.
7,970,013 B2    6/2011  Sinha et al.
(Continued)

FOREIGN PATENT DOCUMENTS

EP          2343934 A1       7/2011
KR     20060104488 A      10/2006
(Continued)

OTHER PUBLICATIONS

International Search Report and Written Opinion—PCT/US2014/026544—ISA/EPO—dated Jul. 28, 2014.

*Primary Examiner* — Phirin Sam
(74) *Attorney, Agent, or Firm* — Patterson & Sheridan, L.L.P.

(57) ABSTRACT

Certain aspects of the present disclosure generally relate to wireless communications and, more particularly, to protecting control frames with power-related subfields. One example apparatus for wireless communications generally includes a processing system configured to generate a control frame comprising one or more power-related subfields and an integrity check value calculated based, at least in part, on the one or more power-related subfields and a transmitter configured to transmit the control frame. In aspects, a power management (PM) subfield, an end-of-service-period (EOSP) subfield, a more data (MD) subfield, or a traffic identifier (TID) subfield can be added to a group of additional authentication data (AAD) and the integrity check value is calculated based on the group of AAD.

20 Claims, 12 Drawing Sheets

Related U.S. Application Data

(60) Provisional application No. 61/788,216, filed on Mar. 15, 2013.

(51) Int. Cl.
*H04L 29/06* (2006.01)
*H04L 1/00* (2006.01)
*H04W 52/58* (2009.01)
*H04W 52/00* (2009.01)
*H04L 1/16* (2006.01)
*H04L 29/08* (2006.01)
*H04W 52/54* (2009.01)
*H04W 84/12* (2009.01)

(52) U.S. Cl.
CPC ............ *H04L 63/123* (2013.01); *H04L 69/00* (2013.01); *H04L 69/324* (2013.01); *H04W 52/00* (2013.01); *H04W 52/54* (2013.01); *H04W 52/58* (2013.01); *H04W 84/12* (2013.01)

(56) References Cited

U.S. PATENT DOCUMENTS

| | | | |
|---|---|---|---|
| 8,165,154 B2 | 4/2012 | Wentink | |
| 8,473,732 B2* | 6/2013 | Ptasinski | H04L 63/123 |
| | | | 713/150 |
| 8,576,761 B1 | 11/2013 | Pitchaiah | |
| 2005/0238016 A1* | 10/2005 | Nishibayashi | H04L 1/1614 |
| | | | 370/389 |
| 2008/0273700 A1 | 11/2008 | Wentink | |
| 2009/0122770 A1* | 5/2009 | Korakis | H04W 12/06 |
| | | | 370/338 |
| 2010/0061272 A1* | 3/2010 | Veillette | H04L 45/34 |
| | | | 370/254 |
| 2011/0044454 A1* | 2/2011 | Baek | H04W 12/04 |
| | | | 380/273 |
| 2011/0096927 A1* | 4/2011 | Baek | H04W 12/04 |
| | | | 380/270 |
| 2012/0224491 A1 | 9/2012 | Norair | |
| 2013/0044607 A1* | 2/2013 | Liu | H04W 8/26 |
| | | | 370/242 |
| 2013/0044877 A1* | 2/2013 | Liu | H04W 8/26 |
| | | | 380/270 |
| 2013/0094475 A1* | 4/2013 | Song | H04W 36/0094 |
| | | | 370/332 |
| 2013/0128808 A1 | 5/2013 | Wentink et al. | |
| 2013/0136145 A1 | 5/2013 | Bi et al. | |
| 2013/0250904 A1* | 9/2013 | Kang | H04B 7/0452 |
| | | | 370/329 |
| 2014/0226667 A1* | 8/2014 | Veillette | H04L 45/34 |
| | | | 370/392 |
| 2014/0269773 A1 | 9/2014 | Wentink et al. | |
| 2015/0139207 A1 | 5/2015 | Seok | |
| 2015/0282157 A1* | 10/2015 | Kim | H04W 48/14 |
| | | | 370/329 |
| 2015/0289164 A1* | 10/2015 | Seok | H04W 4/70 |
| | | | 370/311 |
| 2017/0070941 A1* | 3/2017 | Veillette | H04L 45/34 |

FOREIGN PATENT DOCUMENTS

| | | |
|---|---|---|
| WO | 2005112301 A2 | 11/2005 |
| WO | WO-2006115999 A2 | 11/2006 |
| WO | WO-2012061751 A2 | 5/2012 |
| WO | WO-2013025820 A2 | 2/2013 |

\* cited by examiner

400

| field | bits | in AAD? |
|---|---|---|
| pv | 2 | yes |
| type | 4 | yes |
| from ds | 1 | yes |
| more frag | 1 | yes |
| pm | 1 | yes |
| md | 1 | yes |
| protected | 1 | yes |
| eosp | 1 | yes |
| reserved | 1 | |
| tid | 3 | yes |
| tot | 16 | |

| field | bits |
|---|---|
| fc | 2 |
| a1 | 2 |
| a2 | 6 |
| sc | 2 |
| a3 | |
| a4 | |
| ccmp | |
| fb | |
| mic | 8 |
| fcs | 4 |
| tot | 24 |

| 14 Byte protected short Null | |
|---|---|
| fc | 2 |
| sc | 2 |
| mic | 8 |
| fcs | 2 |
| tot | 14 |

| 14 Byte protected short Null | |
|---|---|
| fc | 2 |
| sc | 2 |
| mic | 6 |
| fcs | 4 |
| tot | 14 |

| 14 Byte protected short Null | |
|---|---|
| fc | 2 |
| id | 2 |
| sc | 2 |
| mic | 4 |
| fcs | 4 |
| tot | 14 |

FIG. 7B

PROTECTED CONTROL FRAMES

CLAIM OF PRIORITY UNDER 35 U.S.C. § 119

This application is a divisional of U.S. patent application Ser. No. 14/207,194 entitled "PROTECTED CONTROL FRAMES", filed Mar. 12, 2014, which claims benefit of U.S. Provisional Patent Application Ser. No. 61/788,216, filed Mar. 15, 2013, which are herein incorporated by reference in their entireties.

BACKGROUND

I. Field of the Invention

Certain aspects of the present disclosure generally relate to wireless communications and, more particularly, to protecting control frames with power-related subfields.

II. Background

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

In order to address the desire for greater coverage and increased communication range, various schemes are being developed. One such scheme is the sub-1-GHz frequency range (e.g., operating in the 902-928 MHz range in the United States) being developed by the Institute of Electrical and Electronics Engineers (IEEE) 802.11ah task force. This development is driven by the desire to utilize a frequency range that has greater wireless range than other IEEE 802.11 groups and has lower obstruction losses.

SUMMARY

Certain aspects of the present disclosure generally relate to wireless communications and, more particularly, to protecting control frames with power-related subfields.

Certain aspects of the present disclosure provide an apparatus for wireless communications. The apparatus typically includes a processing system configured to generate a control frame comprising one or more power-related subfields and an integrity check value calculated based, at least in part, on the one or more power-related subfields and a transmitter configured to transmit the control frame.

Certain aspects of the present disclosure provide an apparatus for wireless communications. The apparatus typically includes a receiver configured to receive a control frame comprising one or more power-related subfields and a processing system configured to perform an integrity check of the control frame based on a comparison of an integrity check value received in the control frame and an integrity check value calculated by the apparatus based, at least in part, on the power-related subfields and discard the control frame if the integrity check fails.

Certain aspects of the present disclosure provide an apparatus for wireless communications. The apparatus typically includes means for generating a control frame comprising one or more power-related subfields and an integrity check value calculated based, at least in part, on the one or more power-related subfields and means for transmitting the control frame.

Certain aspects of the present disclosure provide an apparatus for wireless communications. The apparatus typically includes means for receiving a control frame comprising one or more power-related subfields, means for performing an integrity check of the control frame based on a comparison of an integrity check value received in the control frame and an integrity check value calculated by the apparatus based, at least in part, on the power-related subfields, and means for discarding the control frame if the integrity check fails.

Certain aspects of the present disclosure provide a method for wireless communications. The method typically includes generating a control frame comprising one or more power-related subfields and an integrity check value calculated based, at least in part, on the one or more power-related subfields and transmitting the control frame.

Certain aspects of the present disclosure provide a method for wireless communications by an apparatus. The method typically includes receiving a control frame comprising one or more power-related subfields, performing an integrity check of the control frame based on a comparison of an integrity check value received in the control frame and an integrity check value calculated by the apparatus based, at least in part, on the power-related subfields, and discarding the control frame if the integrity check fails.

Certain aspects of the present disclosure provide a computer program product for wireless communications. The computer program product typically includes a computer-readable medium having instructions stored thereon, the instructions executable by an apparatus for generating a control frame comprising one or more power-related subfields and an integrity check value calculated based, at least in part, on the one or more power-related subfields, and transmitting the control frame.

Certain aspects of the present disclosure provide a computer program product for wireless communications. The computer program product typically includes a computer-readable medium having instructions stored thereon, the instructions executable by an apparatus for receiving a control frame comprising one or more power-related subfields, performing an integrity check of the control frame based on a comparison of an integrity check value received in the control frame and an integrity check value calculated by the apparatus based, at least in part, on the power-related subfields, and discarding the control frame if the integrity check fails.

Certain aspects of the present disclosure provide an access point. The access point typically includes at least one antenna, a processing system configured to generate a control frame comprising one or more power-related subfields and an integrity check value calculated based, at least in part, on the one or more power-related subfields, and a transmitter configured to transmit the control frame via the at least one antenna.

Certain aspects of the present disclosure provide a wireless station. The wireless station typically includes at least one antenna, a receiver configured to receive, via the at least one antenna, a control frame comprising one or more power-related subfields and a processing system configured to perform an integrity check of the control frame based on a comparison of an integrity check value received in the control frame and an integrity check value calculated by the wireless station based, at least in part, on the power-related subfields and discard the control frame if the integrity check fails.

Various aspects and features of the disclosure are described in further detail below.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

FIG. 4 is a table illustrating an example frame control (FC) field of short frames, in accordance with certain aspects of the present disclosure.

FIG. 5 is a table illustrating an example protected short null frame, in accordance with certain aspects of the present disclosure.

FIG. 7B illustrates example 14-byte protected short null response frames, in accordance with certain aspects of the present disclosure.

DETAILED DESCRIPTION

Figure 1:
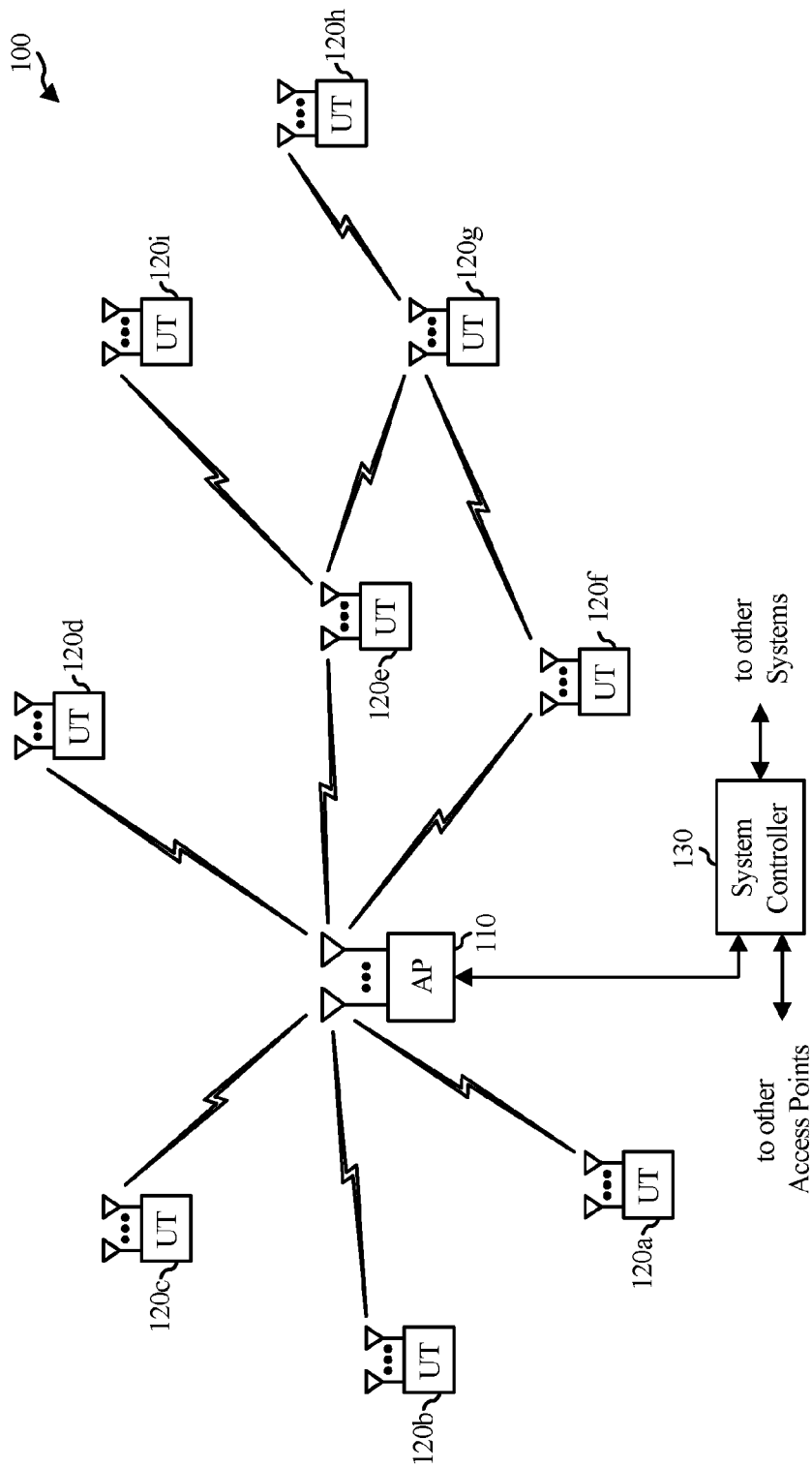
FIG. 1 illustrates a diagram of an example wireless communications network, in accordance with certain aspects of the present disclosure.

Techniques and apparatus are provided herein for a short frame structure which includes power-related subfields in the Additional Authentication Data (AAD) in order to reliably transmit control frames in an authenticated manner. A Manage Integrity Check (MIC) value can be calculated based on the power-related subfields. If a control frame fails the integrity check, the frame is considered to be a spoofed frame and will be dropped.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Example Wireless Communication System

The techniques described herein may be used for various broadband wireless communication systems, including communication systems that are based on an orthogonal multiplexing scheme. Examples of such communication systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system may utilize sufficiently different directions to simultaneously transmit data belonging to multiple user terminals. A TDMA system may allow multiple user terminals to share the same frequency channel by dividing the transmission signal into different time slots, each time slot being assigned to different user terminal. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The teachings herein may be incorporated into (e.g., implemented within or performed by) a variety of wired or wireless apparatuses (e.g., nodes). In some aspects, a wireless node implemented in accordance with the teachings herein may comprise an access point or an access terminal.

An access point ("AP") may comprise, be implemented as, or known as a Node B, Radio Network Controller ("RNC"), evolved Node B (eNB), Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

An access terminal ("AT") may comprise, be implemented as, or known as a subscriber station, a subscriber unit, a mobile station (MS), a remote station, a remote terminal, a user terminal (UT), a user agent, a user device, user equipment (UE), a user station, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a tablet, a portable communication device, a portable computing device (e.g., a personal data assistant), an entertainment device (e.g., a music or video device, or a satellite radio), a global positioning system (GPS) device, or any other suitable device that is configured to communicate via a wireless or wired medium. In some aspects, the node is a wireless node. Such wireless node may provide, for example, connectivity for or to a network (e.g., a wide area network such as the Internet or a cellular network) via a wired or wireless communication link.

FIG. 1 illustrates a multiple-access multiple-input multiple-output (MIMO) system 100 with access points and user terminals. For simplicity, only one access point 110 is shown in FIG. 1. An access point is generally a fixed station that communicates with the user terminals and may also be referred to as a base station or some other terminology. A user terminal may be fixed or mobile and may also be referred to as a mobile station, a wireless device, or some other terminology. Access point 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal. A system controller 130 couples to and provides coordination and control for the access points.

While portions of the following disclosure will describe user terminals 120 capable of communicating via Spatial Division Multiple Access (SDMA), for certain aspects, the user terminals 120 may also include some user terminals that do not support SDMA. Thus, for such aspects, an AP 110 may be configured to communicate with both SDMA and non-SDMA user terminals. This approach may conveniently allow older versions of user terminals ("legacy" stations) to remain deployed in an enterprise, extending their useful lifetime, while allowing newer SDMA user terminals to be introduced as deemed appropriate.

The system 100 employs multiple transmit and multiple receive antennas for data transmission on the downlink and uplink. The access point 110 is equipped with $N_{ap}$ antennas and represents the multiple-input (MI) for downlink transmissions and the multiple-output (MO) for uplink transmissions. A set of K selected user terminals 120 collectively represents the multiple-output for downlink transmissions and the multiple-input for uplink transmissions. For pure SDMA, it is desired to have $N_{ap} \geq K \geq 1$ if the data symbol streams for the K user terminals are not multiplexed in code, frequency or time by some means. K may be greater than $N_{ap}$ if the data symbol streams can be multiplexed using TDMA technique, different code channels with CDMA, disjoint sets of subbands with OFDM, and so on. Each selected user terminal transmits user-specific data to and/or receives user-specific data from the access point. In general, each selected user terminal may be equipped with one or multiple antennas (i.e., $N_{ut} \geq 1$). The K selected user terminals can have the same or different number of antennas.

The SDMA system may be a time division duplex (TDD) system or a frequency division duplex (FDD) system. For a TDD system, the downlink and uplink share the same frequency band. For an FDD system, the downlink and uplink use different frequency bands. MIMO system 100 may also utilize a single carrier or multiple carriers for transmission. Each user terminal may be equipped with a single antenna (e.g., in order to keep costs down) or multiple antennas (e.g., where the additional cost can be supported). The system 100 may also be a TDMA system if the user terminals 120 share the same frequency channel by dividing transmission/reception into different time slots, each time slot being assigned to different user terminals 120.

Figure 2:
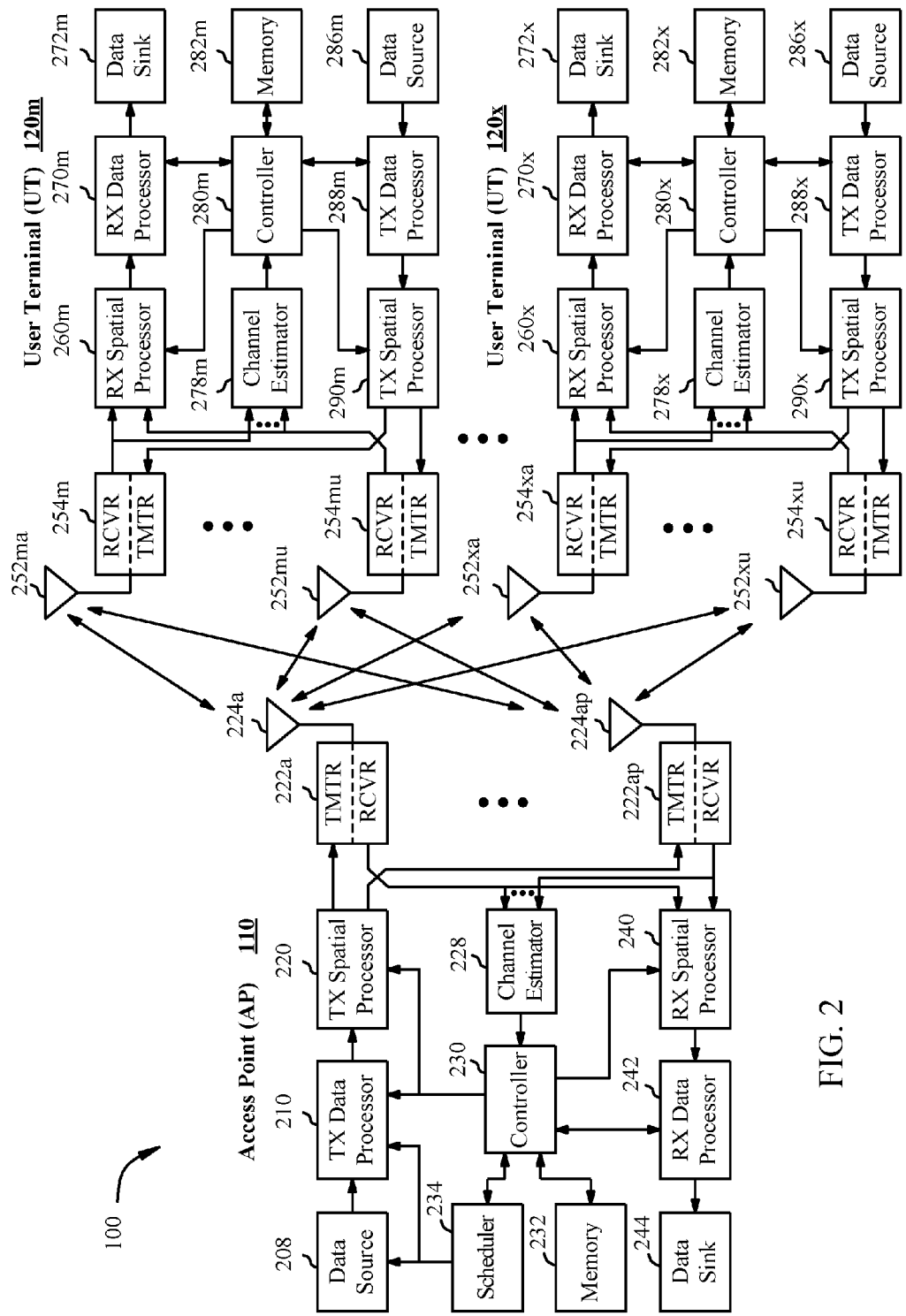
FIG. 2 illustrates a block diagram of an example access point and user terminals, in accordance with certain aspects of the present disclosure.

FIG. 2 illustrates a block diagram of access point 110 and two user terminals 120m and 120x in MIMO system 100. The access point 110 is equipped with $N_t$ antennas 224a through 224t. User terminals 120m are equipped with $N_{ut,m}$ antennas 252ma through 252mu, and user terminal 120x is equipped with $N_{ut,x}$ antennas 252xa through 252xu. The access point 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel. In the following description, the subscript "dn" denotes the downlink, the subscript "up" denotes the uplink, Nup user terminals are selected for simultaneous transmission on the uplink, Ndn user terminals are selected for simultaneous transmission on the downlink, Nup may or may not be equal to Ndn, and Nup and Ndn may be static values or can change for each scheduling interval. The beam-steering or some other spatial processing technique may be used at the access point and user terminal.

On the uplink, at each user terminal 120 selected for uplink transmission, a transmit (TX) data processor 288 receives traffic data from a data source 286 and control data from a controller 280. TX data processor 288 processes (e.g., encodes, interleaves, and modulates) the traffic data for the user terminal based on the coding and modulation schemes associated with the rate selected for the user terminal and provides a data symbol stream. A TX spatial processor 290 performs spatial processing on the data symbol stream and provides $N_{ut,m}$ transmit symbol streams for the $N_{ut,m}$ antennas. Each transmitter unit (TMTR) 254 receives and processes (e.g., converts to analog, amplifies, filters, and frequency upconverts) a respective transmit symbol stream to generate an uplink signal. $N_{ut,m}$ transmitter units 254 provide $N_{ut,m}$ uplink signals for transmission from $N_{ut,m}$ antennas 252 to the access point.

Nup user terminals may be scheduled for simultaneous transmission on the uplink. Each of these user terminals performs spatial processing on its data symbol stream and transmits its set of transmit symbol streams on the uplink to the access point.

At access point 110, $N_{ap}$ antennas 224a through 224ap receive the uplink signals from all Nup user terminals transmitting on the uplink. Each antenna 224 provides a received signal to a respective receiver unit (RCVR) 222. Each receiver unit 222 performs processing complementary to that performed by transmitter unit 254 and provides a received symbol stream. An RX spatial processor 240 performs receiver spatial processing on the $N_{ap}$ received symbol streams from $N_{ap}$ receiver units 222 and provides Nup recovered uplink data symbol streams. The receiver spatial processing is performed in accordance with the channel correlation matrix inversion (CCMI), minimum mean square error (MMSE), soft interference cancellation (SIC), or some other technique. Each recovered uplink data symbol stream is an estimate of a data symbol stream transmitted by a respective user terminal. An RX data processor 242 processes (e.g., demodulates, deinterleaves, and decodes) each recovered uplink data symbol stream in accordance with the rate used for that stream to obtain decoded data. The decoded data for each user terminal may be provided to a data sink 244 for storage and/or a controller 230 for further processing.

On the downlink, at access point 110, a TX data processor 210 receives traffic data from a data source 208 for Ndn user terminals scheduled for downlink transmission, control data from a controller 230, and possibly other data from a scheduler 234. The various types of data may be sent on different transport channels. TX data processor 210 processes (e.g., encodes, interleaves, and modulates) the traffic data for each user terminal based on the rate selected for that user terminal. TX data processor 210 provides Ndn downlink data symbol streams for the Ndn user terminals. A TX spatial processor 220 performs spatial processing (such as a precoding or beamforming, as described in the present disclosure) on the Ndn downlink data symbol streams, and provides $N_{ap}$ transmit symbol streams for the $N_{ap}$ antennas. Each transmitter unit 222 receives and processes a respective transmit symbol stream to generate a downlink signal. $N_{ap}$ transmitter units 222 providing $N_{ap}$ downlink signals for transmission from $N_{ap}$ antennas 224 to the user terminals.

At each user terminal 120, $N_{ut,m}$ antennas 252 receive the $N_{ap}$ downlink signals from access point 110. Each receiver unit 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream for the user terminal. The receiver spatial processing is performed in accordance with the CCMI, MMSE or some other technique. An RX data processor 270 processes (e.g., demodulates, deinterleaves and decodes) the recovered downlink data symbol stream to obtain decoded data for the user terminal.

At each user terminal 120, a channel estimator 278 estimates the downlink channel response and provides downlink channel estimates, which may include channel gain estimates, SNR estimates, noise variance and so on. Similarly, a channel estimator 228 estimates the uplink channel response and provides uplink channel estimates. Controller 280 for each user terminal typically derives the spatial filter matrix for the user terminal based on the downlink channel response matrix Hdn,m for that user terminal. Controller 230 derives the spatial filter matrix for the access point based on the effective uplink channel response matrix Hup,eff. Controller 280 for each user terminal may send feedback information (e.g., the downlink and/or uplink eigenvectors, eigenvalues, SNR estimates, and so on) to the access point. Controllers 230 and 280 also control the operation of various processing units at access point 110 and user terminal 120, respectively.

Figure 3:
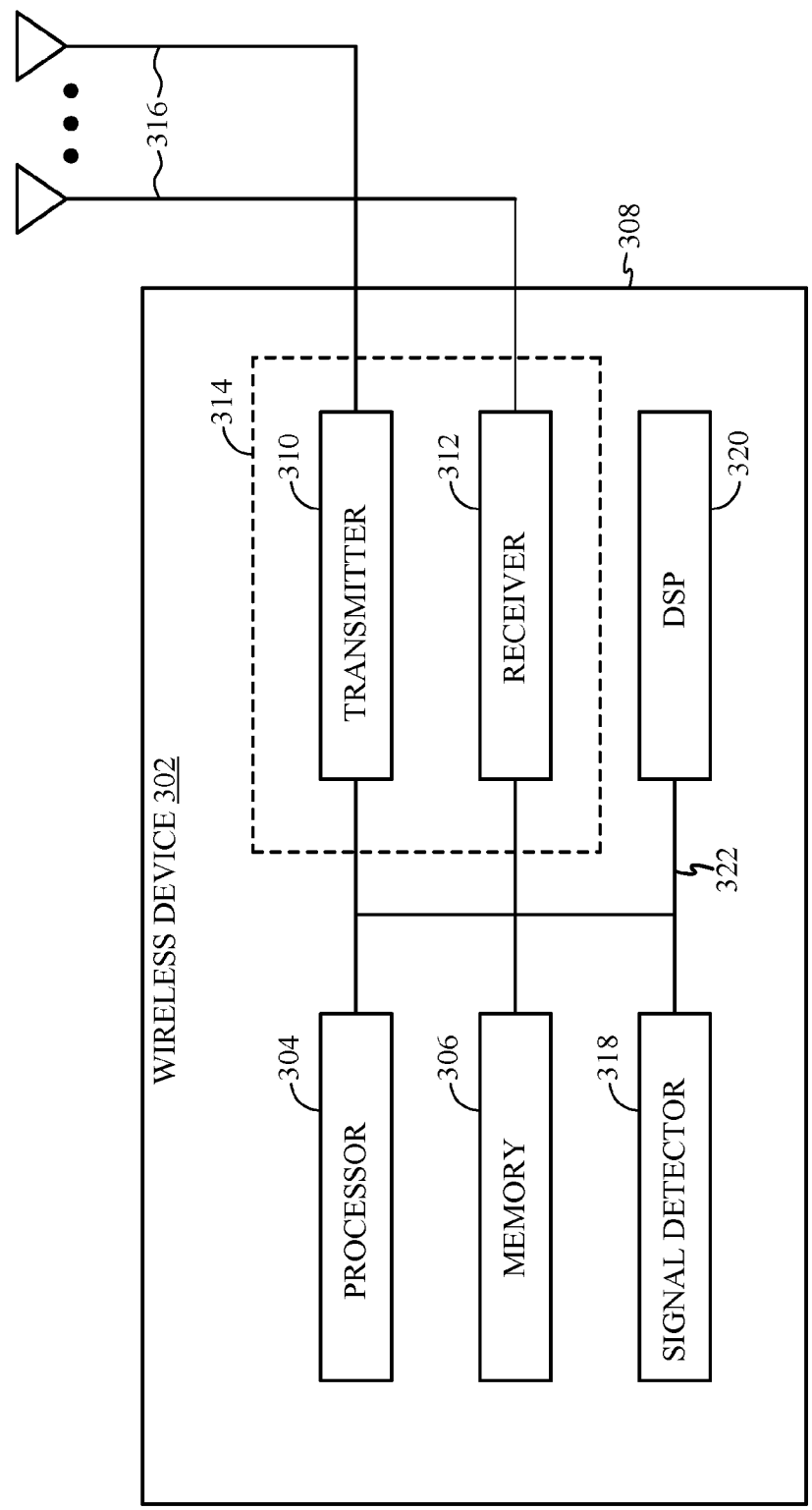
FIG. 3 illustrates a block diagram of an example wireless device, in accordance with certain aspects of the present disclosure.

FIG. 3 illustrates various components that may be utilized in a wireless device 302 that may be employed within the MIMO system 100. The wireless device 302 is an example of a device that may be configured to implement the various methods described herein. The wireless device 302 may be an access point 110 or a user terminal 120.

The wireless device 302 may include a processor 304 which controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein.

The wireless device 302 may also include a housing 308 that may include a transmitter 310 and a receiver 312 to allow transmission and reception of data between the wireless device 302 and a remote location. The transmitter 310 and receiver 312 may be combined into a transceiver 314. A single or a plurality of transmit antennas 316 may be attached to the housing 308 and electrically coupled to the transceiver 314. The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The various components of the wireless device 302 may be coupled together by a bus system 322, which may include a power bus, a control signal bus, and a status signal bus in addition to a data bus.

Protected Control Frames

Aspects of the present disclosure provide techniques that may be employed to provide protected control frames having power management related subfields included in the Additional Authentication Data (AAD) field of a control frame. Including power management related subfields in the AAD allows the Message Integrity Check (MIC) field value to be calculated based on the power management related subfields and, thus, the power management subfields can be reliably transmitted in an authenticated manner between a station and an access point.

This disclosure may use the following acronyms:

| | |
|---|---|
| A1 | Address 1 |
| A2 | Address 2 |

-continued

| | |
|---|---|
| A3 | Address 3 |
| A4 | Address 4 |
| AAD | Additional Authentication Data |
| CBC-MAC | Cipher-block Chaining Message Authentication Code |
| CCMP | Counter Mode with CBC-MAC Protocol |
| CTR | Counter Mode |
| DS | Distribution System |
| EOSP | End of Service Period |
| FB | Frame Body |
| FC | Frame Control |
| FCS | Frame Check Sequence |
| ID | Identifier |
| MAC | Media Access Control |
| MD | More Data |
| MIC | Message Integrity Check |
| MPDU | MAC Protocol Data Unit |
| PHY | Physical Layer |
| PM | Power Management |
| PS-Poll | Power Save Poll |
| PSDU | PHY Service Data Unit |
| PV | Protocol Value |
| SC | Sequence Control |
| SID | Short Identifier |
| SIG | Signal Field |
| STA | Station |
| TID | Traffic Identifier |

A MIC is currently used in conventional unicast and broadcast frames to protect the content of the frames. Certain frames referred to as "short frames" use protocol version (PV) 1. The short frames differ from conventional frames, for example, in that the short frames have no duration field, different MAC frames, etc.

The AAD is a field generated internally inside a transmitter and a receiver with all fields and subfields desired to be protected by the MIC. The MIC ensures that a frame cannot be sent with changed content of the protected fields. The MIC value is thus the result of the value of all the fields included in the AAD and the security key. The MIC value is uniquely matched to the frame, and if anything changes the MIC value will not match the MIC generator at the receiver.

In an exemplary scenario, a station (STA) may send information to an access point (AP). The STA may send information telling the AP that the STA is going into sleep mode (e.g., the STA sets the power management (PM) bit to 1). However, currently, some other STA may send a "spoofed" frame to the AP as if it is from the original STA, and the AP cannot tell whether the frame is from the original STA or is a spoofed frame. This is because currently only a data short frame is defined; control frames are not. 802.11 control frames are not cryptographically protected, nor are certain fields of the MAC header, such as the Retry field, PM subfield, End-of-Service-Period (EOSP) subfield, More Data (MD) subfield, Traffic Identifier (TID) subfield, etc. These fields are currently not included in the AAD. This means that such frames or frame fields may be spoofed by an attacker, with possibly unwanted effects.

Accordingly, what is needed are approaches for protecting control frames. Techniques and apparatus are provided herein for adding secure control frames to the short frames that have been defined in 802.11ah. Certain fields of the short MAC header may be added to the counter mode with CBC/MAC protocol (CCMP) AAD such that they are protected by the MIC field. Other subfields of the Frame Control (FC) field, such as the Protocol Version (PV) field and the Type field, conventionally are already included in the group of AAD.

FIG. 4 is a table 400 illustrating an example FC field of protected short frames, in accordance with certain aspects of the present disclosure. As shown in FIG. 4, a 16-bit FC field may include a 2-bit PV subfield, a 4-bit Type subfield, a 1-bit Distribution System (DS) subfield, a 1-bit More Frag subfield, a 1-bit PM subfield, a 1-bit MD subfield, a 1-bit Protected subfield, a 1-bit EOSP subfield, a 3-bit TID subfield, and a reserved bit. As shown in table 400, each of the subfields of the FC field may be included in the AAD except for the reserved bit.

According to certain aspects, a frame with no data and only a FC field may be used. For certain aspects, a protected short null frame may be defined. FIG. 5 is a table 500 illustrating an example protected short null frame, in accordance with certain aspects of the present disclosure. As shown in FIG. 5, the 24-byte protected short null frame may have a 2-byte FC field, a 2-byte first address (A1) field, a 6-byte second address (A2) field, a 9-byte MIC field, and a 4-byte FCS field, for a total of 24 bytes. As shown in FIG. 5, third and fourth address (A3 and A4) fields—typically used to indicate source destination for transmit and receive—may not be included. In aspects, the CCMP field may be assumed to coincide with the Sequence Control (SC) field and may be reduced or eliminated. In aspects, the Frame Body (FB) field may be empty. For certain aspects, the A1 and A2 field order may be flipped: the A2 field may have 2-bytes and the A1 may have 6-bytes.

According to certain aspects, the response to a protected short Null frame, transmitted to an access point (AP) by a station (STA), may also be a protected short Null frame, such that the first short Null frame functions as a trigger and the second short Null frame functions as an acknowledgment (ACK) frame that indicates whether traffic is buffered. For example, the second short Null frame ACK may include EOSP=0 (e.g., indicating more traffic is in the buffer) if traffic is buffered or EOSP=1 (e.g., indicating end of service period) if traffic is not buffered. This exchange of Null frames may be referred to as a Null Request/Response exchange, even though the request and the response may be the same frames.

A PS-Poll/ACK exchange is a conventional unprotected approach for requesting buffered data. The Null Request/Response protected short Null frame exchange may replace a PS-Poll/ACK exchange because a Null frame that acts as a trigger is similar to a PS-Poll frame (e.g., the short protected Null frame will have the shortest possible length, while the existing PS-Poll frame is shorter than the existing QoS-Null frame that can act as a trigger frame).

Figure 6:
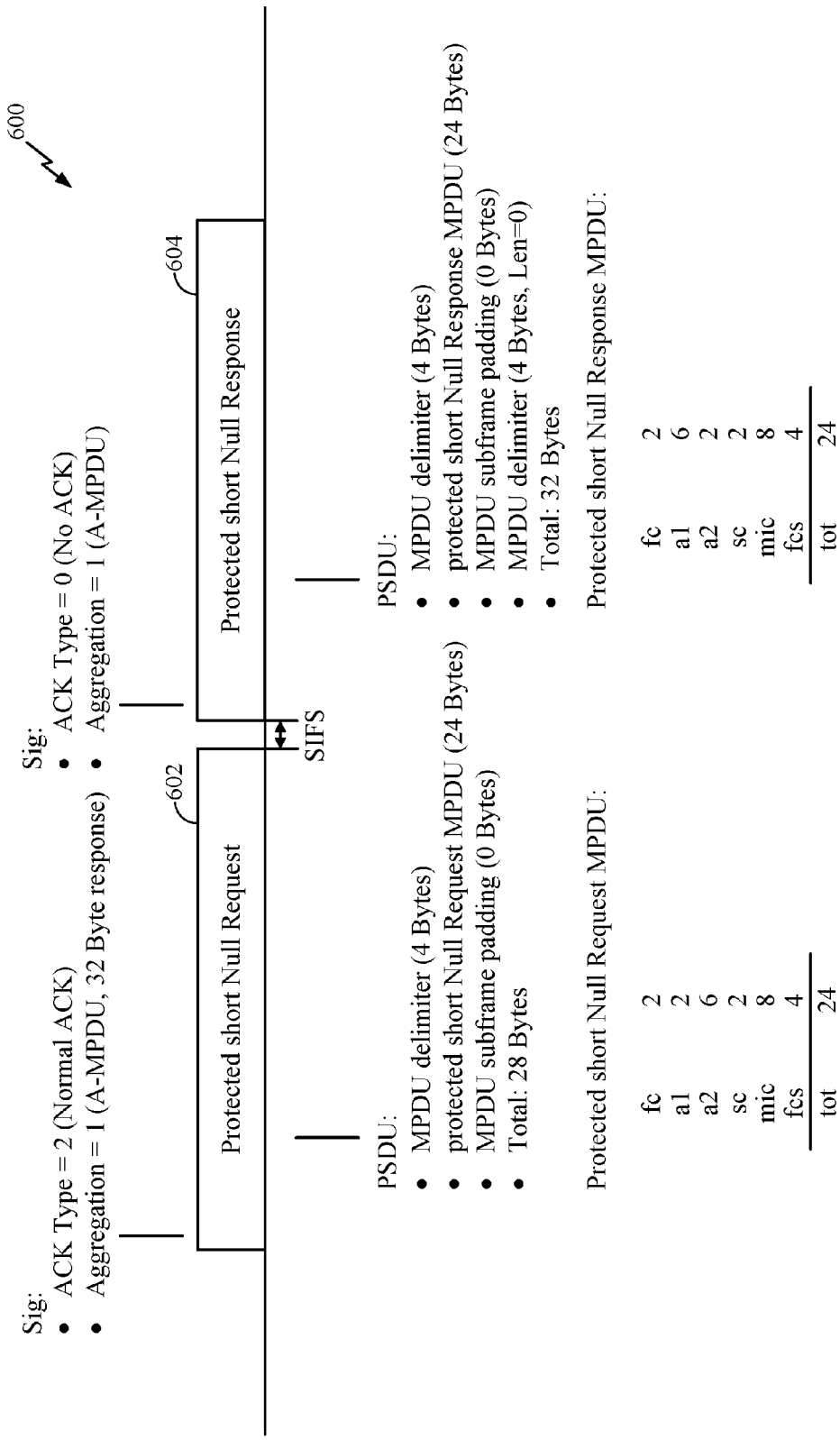
FIG. 6 illustrates an example protected short null request/response exchange, in accordance with certain aspects of the present disclosure.

FIG. 6 illustrates an example protected short null Request/Response exchange 600, in accordance with certain aspects of the present disclosure. As shown in FIG. 6, a protected short Null Request frame 602 may be transmitted as a trigger and a protected short Null Response frame 604 may be sent as an ACK. As shown in FIG. 6, the soliciting protected short Null Request frame 602 may include a 2-bit ACK Type subfield in the signal (SIG) field—which is in the physical layer (PHY) header of 802.11ah frames—which may be set to 2 (e.g., indicating Normal ACK, which means a 14-byte response is expected). The soliciting protected short Null Request frame 602 may also include the Aggregation subfield in the SIG field which may be set to 1 (e.g., indicating aggregated MAC protocol data unit (A-MPDU), which means that the PSDU starts with an MPDU delimiter and expects a 32-byte response).

In aspects, the protected short Null Request PSDU (e.g., handed from the PHY layer to the MAC layer) may include a 4-byte MPDU delimiter and a 24-byte protected short Null request MPDU for a total of 28 bytes. The PSDU may include 0 bytes of subframe padding. In aspects, the 24-byte protected short Null Request MPDU may include a 2-byte FC field, a 2-byte A1 field, a 6-byte A2 field, a 2-byte SC field, an 8-byte MIC field, and a 4-byte FCS field, for a total of 24 bytes.

In aspects, the protected short Null Response frame 604 may be transmitted within a short interframe spacing (SIFS) of the protected short Null Request frame 602. The protected short Null Response frame 604 may be sent with ACK Type=0 (e.g., indicating No ACK) and Aggregation=1 (e.g., indicating Aggregation) in the SIG field. The protected short Null Response frame 604 may start with a 4-byte MPDU delimiter, and additional MPDU delimiters can be added to ensure that the frame has a 32-byte length: the expected length by the STA when ACK Type is 2 (Normal ACK) and Aggregation=1 (MPDU aggregation). In aspects, the MPDU delimiter may be at the start or end of the frame.

As shown in FIG. 6, the protected short Null Response PSDU may include a 4-byte MPDU delimiter, a 24-byte protected short Null Response MPDU, and another 4-byte MPDU delimiter (Len=0), for a total of 32 bytes as expected by the STA. For certain aspects, the second MPDU delimiter may be located directly after the first MPDU delimiter. The 24-byte protected short Null Response MPDU may include the same fields as the 24-byte protected short Null Request MPDU, except the A1 field and A2 field may be switched (a 6-byte A1 field and a 2-byte A2 field). For certain aspects, the short Null Request MPDU may include a 6-byte A1 field and a 2-byte A2 field, and the short Null Response MPDU may include a 2-byte A1 field and a 6-byte A2 field.

Figure 7A:
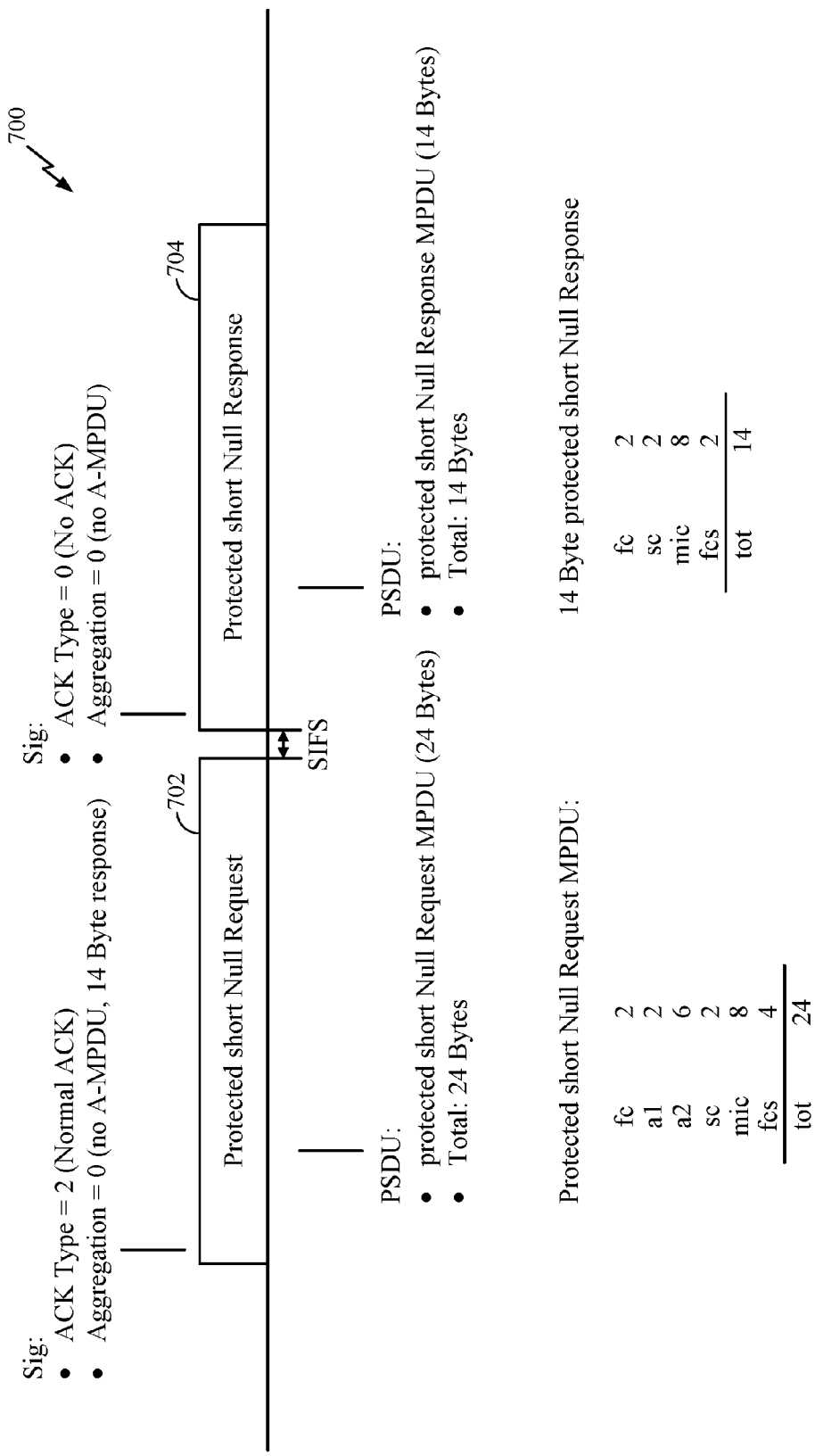
FIG. 7A illustrates an example protected short null request/response exchange, in accordance with certain aspects of the present disclosure.

FIG. 7A illustrates an example protected short null Request/Response exchange 700, in accordance with certain aspects of the present disclosure. For certain aspects, the soliciting protected short Null Request frame 702 uses ACK Type 2 (Normal ACK) and Aggregation=0 (no MPDU aggregation) in the SIG field. The expected response in this case has a 14-byte length instead of 24-byte. As shown in FIG. 7A, the protected short Null Request PSDU may include only 24-Byte protect short Null request for a total of 24 bytes. The protected short Null Request MPDU may be the same as for the case of ACK Type=2, Aggregation=1.

As shown in FIG. 7A, the protected short Null Response PSDU may include only a 14-byte protected short Null Response MPDU. The 14-byte protected short Null Response MPDU may include a 2-byte FC field, a 2-byte SC field, an 8-byte MIC, and a 2-byte FCS. For certain aspects, a 14-byte protected short Null Response frame 704 may be devised using several shortcuts. For example, only a short identifier (SID) and no full MAC address may be included, the MIC may be included only partially, and the FCS may be omitted entirely.

FIG. 7B illustrates example alternative 14-byte protected short Null Response frames 704, in accordance with certain aspects of the present disclosure. In aspects, the short Null Response MPDU may include a 2-byte FC field, a 2-byte SC field, a 6-byte MIC field, and a 4-byte FCS field. Alternatively, the short Null Response MPDU may include a 2-byte FC field, a 2-byte ID field, a 2-byte SC field, a 4-byte MIC field, and a 4-byte FCS field.

According to certain aspects, in order to simplify the implementation, the power-related bits in the FC field may be reserved on short frames other than Short Null Request/Response frames.

Figure 8:
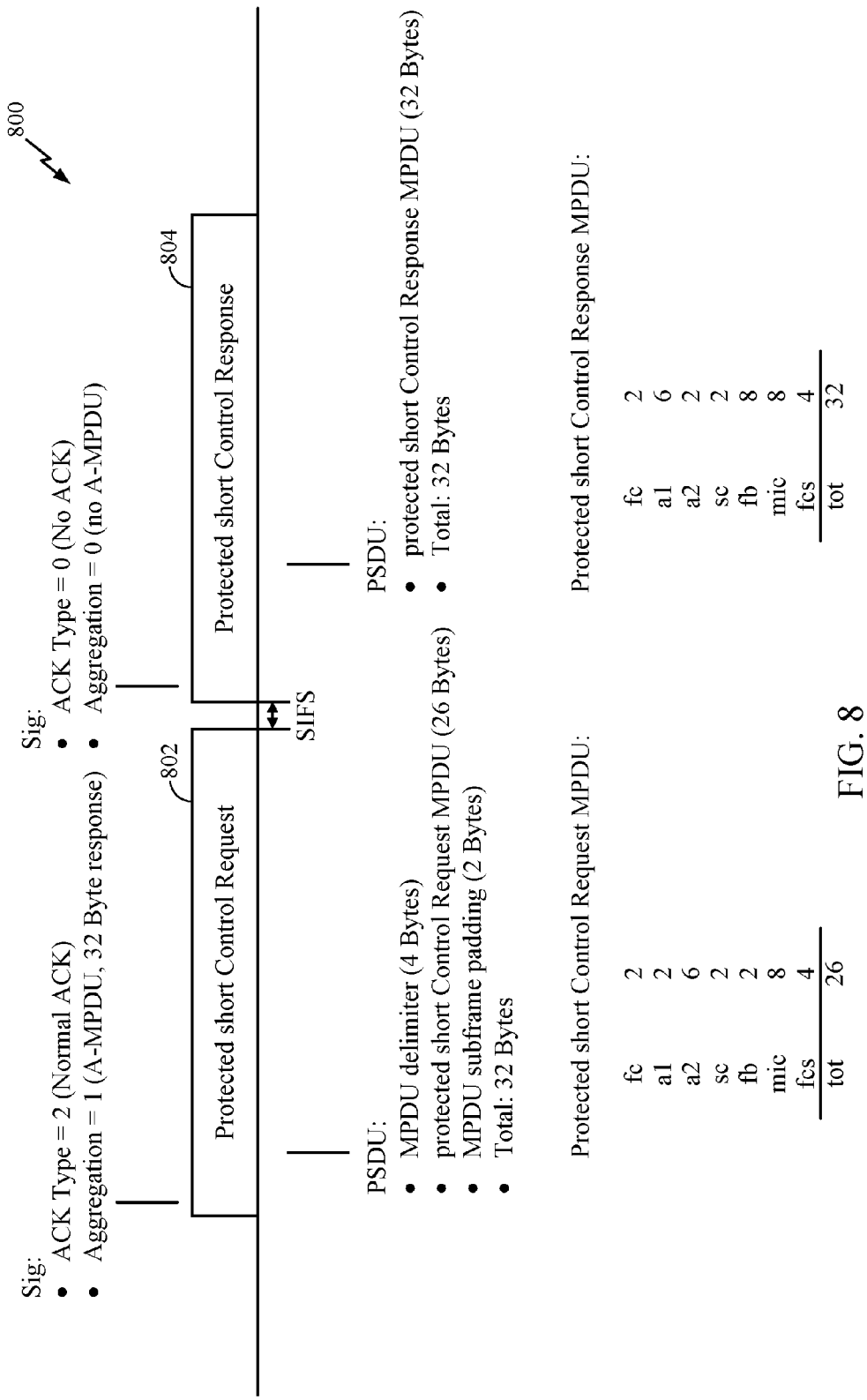
FIGS. 8 and 9 illustrate example protected short Control Request/Response exchanges, in accordance with certain aspects of the present disclosure.

FIG. 8 illustrates an example protected short Control Request/Response exchange 800, in accordance with certain aspects of the present disclosure. As shown in FIG. 8, a protected short Control Request frame 802 may be defined with ACK Type=2 (Normal ACK) and Aggregation=1 (A-MPDU, 32-byte response expected) in the SIG field. The protected short Control Request PSDU may include a 4-byte MPDU delimiter, a 26-byte protected short Control Request MPDU, and a 2-byte MPDU subframe padding, for a total of 32 bytes. The protected short Control Request MPDU may include the same fields as the protected short Null Request subframes, with the addition of a 2-byte FB field after the SC field. The FB field may contain control-related information, such as a PM subfield, MD subfield, EOSP subfield, TID subfield, and the like. These subfields may be omitted from the FC field in this case.

As shown in FIG. 8, the protected short Control Response frame 804 may include ACK Type=0 (no ACK) and Aggregation=0 (no A-MPDU) in the SIG field. The protected short Control Response PSDU may include a 32-byte protected short Control Response MPDU. The 32-byte protected short Control Response MPDU may include a 2-byte FC field, a 6-byte A1 field, a 2-byte A2 field, 2-byte SC field, an 8-byte FB field, an 8-byte MIC field, and a 4-byte FCS field, for a total of 32 bytes. The FB field may contain control-related information, such as a PM subfield, MD subfield, EOSP subfield, TID subfield, and so on. These subfields may be omitted from the FC field in this case.

Figure 9:
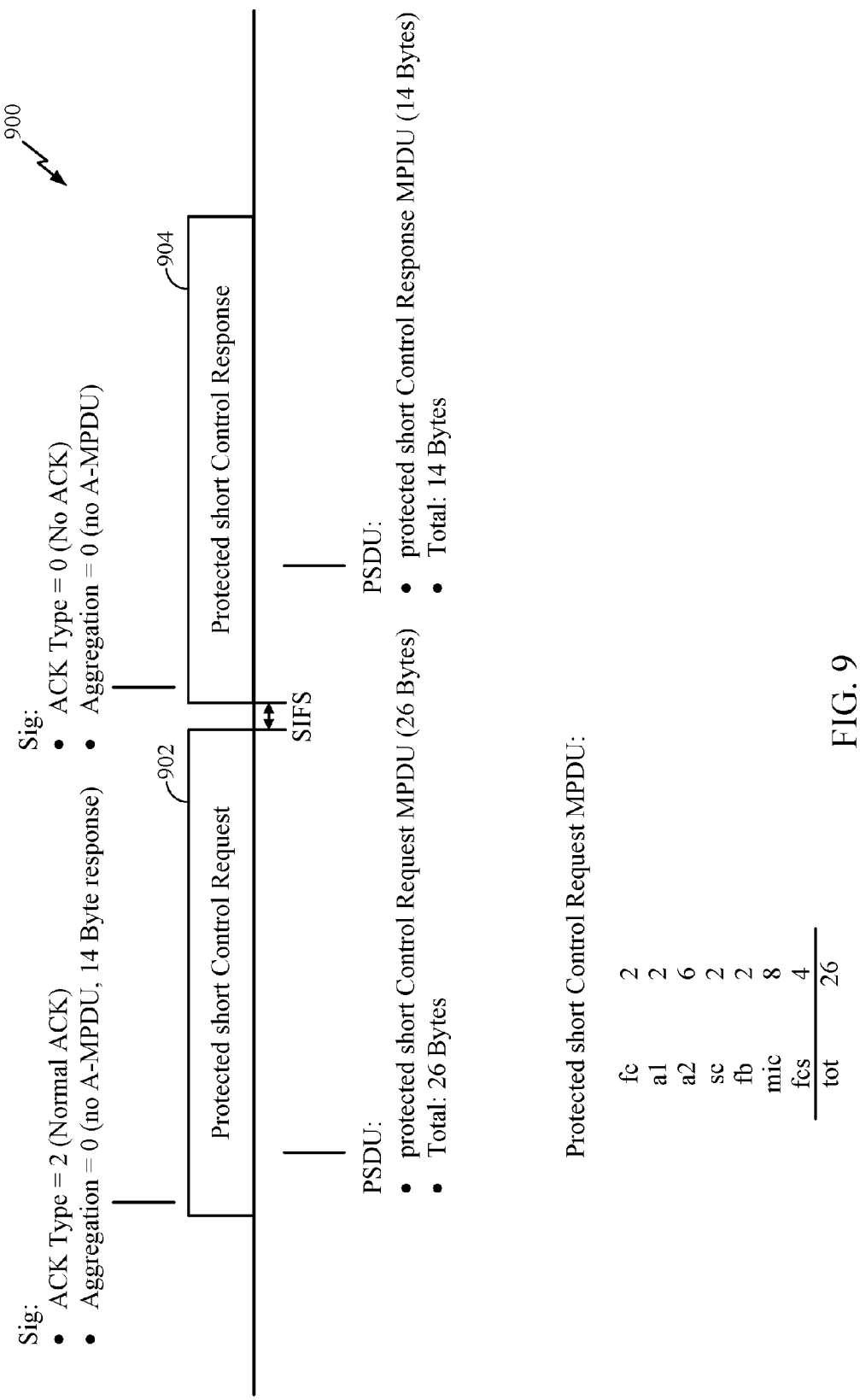

FIG. 9 illustrates an example alternative protected short Control Request/Response exchange 900, in accordance with certain aspects of the present disclosure. As shown in FIG. 9, a protected short Control Response frame 902 may be defined with ACK Type=2 (Normal ACK0 and Aggregation=1 (A-MPDU, 32-byte response expected) in the SIG field. The protected short Control Response PSDU may include a 26-byte protected short Control Response MPDU. The 26-byte protected short Control Response MPDU may include the same fields as the protected short Control Request frame 802 and an FB field.

As shown in FIG. 9, the protected short Control Response frame 904 may include ACK Type=0 (no ACK) and Aggregation=0 (no A-MPDU) in the SIG field, similar to the short control Response frame 804. However, the protected short Control Response PSDU includes only a 14-byte protected short Control Response MPDU.

According to certain aspects, the protected short Control Responses may be sent within one SIFS of the protected short Control Requests.

Figure 10A:
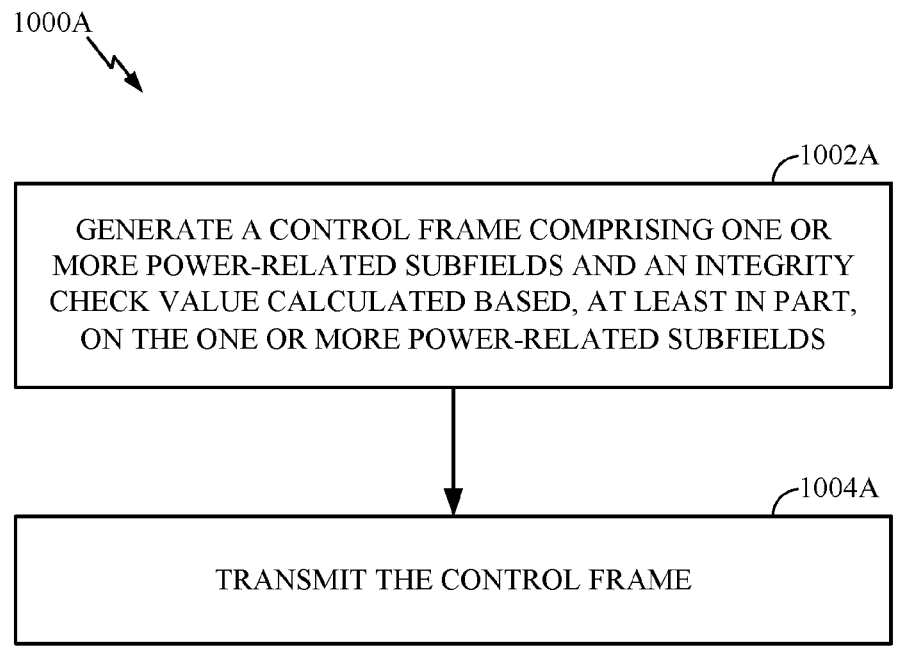
FIG. 10A illustrates example operations for transmitting a control frame, in accordance with certain aspects of the present disclosure.

FIG. 10A is a flow diagram of example operations 1000A for wireless communications, in accordance with certain aspects of the present disclosure. The operations 1000A may be performed, for example, by an apparatus (e.g., such as the access point 110 referenced in FIG. 2). The operations 1000A may begin, at 1002A by generating a control frame comprising one or more power-related subfields and an integrity check value calculated based, at least in part, on the one or more power-related subfields. For example, the control frame may include at least one of a PM subfield, an EOSP subfield, an MD subfield, or a TID subfield. The power-related subfields may be included in the AAD and protected by the MIC. For certain aspects, the control frame includes a frame control (FC) field that includes the power-related subfields.

At 1004A, the AP 110 may transmit the control frame to a user terminal 120, for example. According to certain aspects, the AP may add the one or more power-related subfields to a group of additional authentication data (AAD). In this case, the integrity check value may be calculated based on the group of AAD.

According to certain aspects, the control frame may be a null request frame. The null request frame may include a signal (SIG) field, wherein an acknowledgment (ACK) type subfield in the SIG field indicates a normal ACK, and wherein an aggregation subfield in the SIG field indicates media access control (MAC) protocol data unit (MPDU) aggregation. For other aspects, the null request frame includes a SIG field, wherein an ACK type subfield in the SIG field indicates a normal ACK, and wherein an aggregation subfield in the SIG field indicates no MPDU aggregation.

Figure 11A:
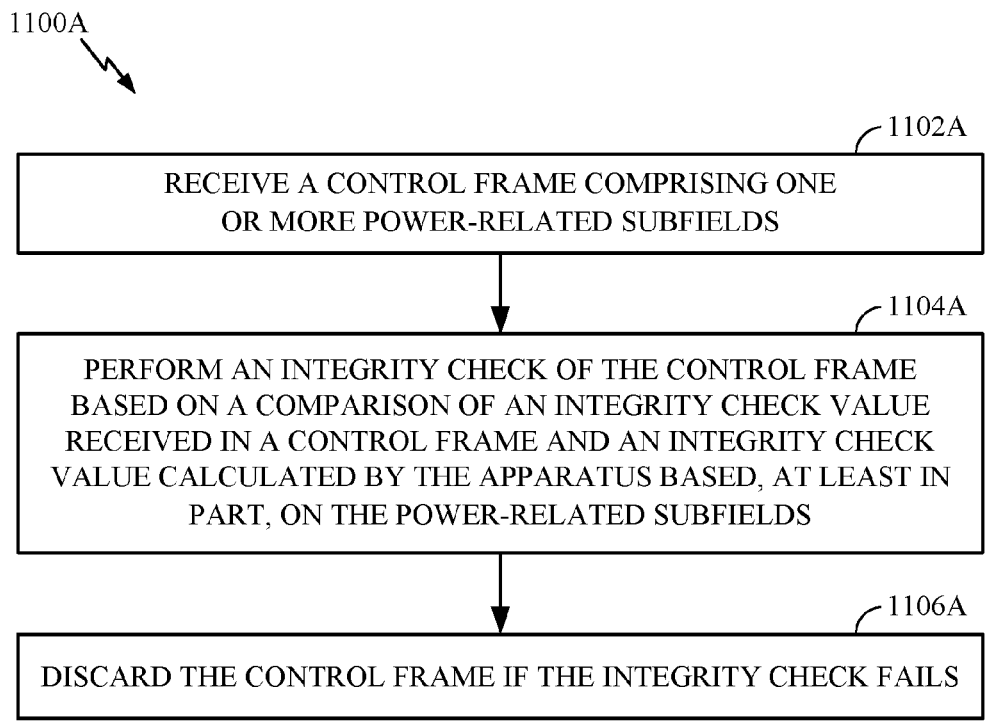
FIG. 11A illustrates example operations for performing an integrity check of a received control frame, in accordance with certain aspects of the present disclosure.

FIG. 11A is a flow diagram of example operations 1100A for wireless communications, in accordance with certain aspects of the present disclosure. The operations 1100A may be performed, for example, by a wireless station (STA) (e.g., such as the user terminal 120 referenced in FIG. 2). Thus, the operations 1100A may be considered complementary to those shown in FIG. 10A.

The operations 1100A may begin, at 1102A by receiving a control frame comprising one or more power-related subfields.

At 1104A, the STA may perform an integrity check of the control frame based on a comparison of an integrity check value received in the control frame and an integrity check value calculated by the STA based, at least in part, on the power-related subfields.

At 1106A, the STA may discard the control frame if the integrity check fails.

According to certain aspects, the control frame may be a null request frame. In such a case, the operations 1100A may further involve the STA transmitting a null response frame in response to the null request frame if the integrity check succeeds.

According to certain aspects, the null response frame includes a signal (SIG) field, wherein an acknowledgment (ACK) type subfield in the SIG field indicates no ACK, and wherein an aggregation subfield in the SIG field indicates media access control (MAC) protocol data unit (MPDU) aggregation. The null response frame may have a length of 32 bytes. For certain aspects, the null response frame comprises a null response MPDU and one or more MPDU delimiters. The null response MPDU may include a frame control (FC) field having the one or more power-related subfields, one or more address fields, a sequence control (SC) field, a message integrity check (MIC) field, and a frame check sequence (FCS) field. For certain aspects, the null response MPDU includes a frame body (FB) field that conveys control information. For certain aspects, the null response MPDU comprises a 2-byte FC field including the one or more power-related subfields, one or more address fields, a 2-byte SC field, an 8-byte MIC field and a 4-byte FCS field. For certain aspects, the MIC field has a MIC value based, at least in part, on the one or more power-related subfields, the one or more address fields, and the SC field.

According to certain aspects, the null response frame comprises 14 bytes. For certain aspects, the null response frame comprises a 2-byte frame control (FC) field including the one or more power-related subfields, a 2-byte sequence control (SC) field, an 8-byte integrity check value, and a 2-byte frame check sequence (FCS). For other aspects, the null response frame comprises a 2-byte FC field including the one or more power-related subfields, a 2-byte ID field, a 2-byte SC field, a 4-byte integrity check value, and a 4-byte FCS.

Figure 10B:
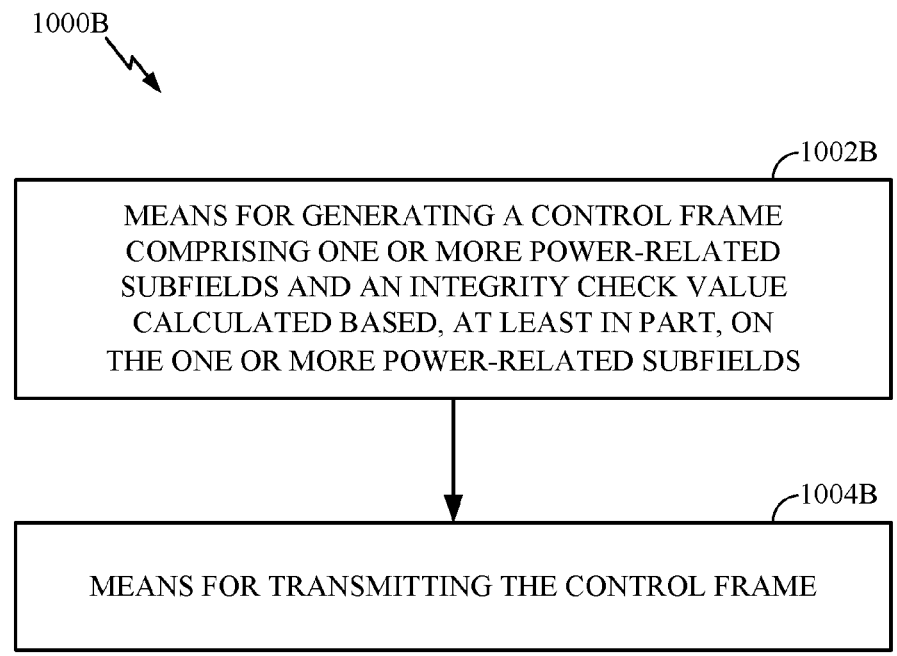
FIG. 10B illustrates example means capable of performing the operations shown in FIG. 10A.
Figure 11B:
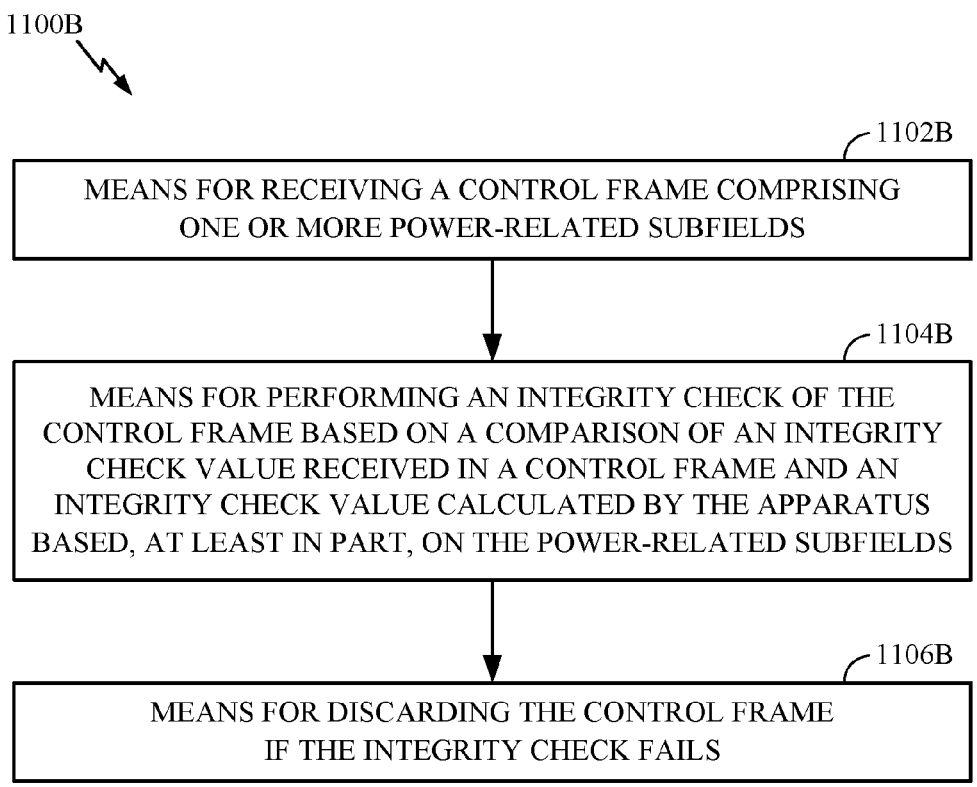
FIG. 11B illustrates example means capable of performing the operations shown in FIG. 11A.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering. For example, operations 1000A and 1100A illustrated in FIGS. 10 and 11 correspond to means 1000B and 1100B illustrated in FIGS. 10B and 11B, respectively.

For example, means for transmitting may comprise a transmitter (e.g., the transmitter unit 222) and/or an antenna(s) 224 of the access point 110 illustrated in FIG. 2, the transmitter unit 254 and/or an antenna(s) 252 of the user terminal 120 illustrated in FIG. 2, or the transmitter 310 and/or antenna(s) 316 depicted in FIG. 3. Means for receiving may comprise a receiver (e.g., the receiver unit 222) and/or an antenna(s) 224 of the access point 110 illustrated in FIG. 2, the receiver unit 254 and/or an antenna(s) 252 of the user terminal 120 illustrated in FIG. 2, or the receiver 312 and/or antenna(s) 316 depicted in FIG. 3. Means for processing, means for determining, means for generating, means for adding, means for discarding a frame, or means for performing an integrity check may comprise a processing system, which may include one or more processors, such as the RX data processor 242, the TX data processor 210, and/or the controller 230 of the access point 110 illustrated in FIG. 2, the RX data processor 270, the TX data processor 288, and/or the controller 280 of the user terminal 120 illustrated in FIG. 2, or the processor 304 and/or the DSP 320 portrayed in FIG. 3.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover a, b, c, a-b, a-c, b-c, and a-b-c.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the wireless node, all which may be accessed by the processor through the bus interface. Alternatively, or in addition, the machine-readable media, or any portion thereof, may be integrated into the processor, such as the case may be with cache and/or general register files.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC (Application Specific Integrated Circuit) with the processor, the bus interface, the user interface in the case of an access terminal), supporting circuitry, and at least a portion of the machine-readable media integrated into a single chip, or with one or more FPGAs (Field Programmable Gate Arrays), PLDs (Programmable Logic Devices), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. An apparatus for wireless communications, comprising:
    an interface configured to obtain a frame lacking a first field that carries data and having at least a second field comprising one or more subfields; and
    a processing system configured to:
        perform an integrity check of the frame based on a comparison of an integrity check value obtained in the frame and an integrity check value calculated by the apparatus based, at least in part, on the one or more subfields; and
        discard the frame if the integrity check fails.

2. The apparatus of claim 1, wherein:
    the frame comprises a request frame; and
    the processing system is further configured to output a response frame for transmission in response to the request frame if the integrity check succeeds.

3. The apparatus of claim 2, wherein the request frame comprises a media access control (MAC) protocol data unit (MPDU).

4. The apparatus of claim 3, wherein the MPDU comprises a frame body (FB) field that conveys control information.

5. The apparatus of claim 3, wherein:
    the second field is a frame control (FC) field; and
    the MPDU comprises the FC field, one or more address fields, a sequence control (SC) field, and a message integrity check (MIC) field.

6. The apparatus of claim 5, wherein the MIC field has a MIC value based, at least in part, on at least one of the one or more subfields, the one or more address fields, or the SC field.

7. The apparatus of claim 2, wherein a size of the request frame is less than 32 bytes.

8. The apparatus of claim 2, wherein the response frame comprises a media access control (MAC) protocol data unit (MPDU) that lacks a field that contains data.

9. The apparatus of claim 8, wherein the MPDU comprises a frame control (FC) field including the one or more subfields, one or more address fields, a sequence control (SC) field, and a message integrity check (MIC) field.

10. The apparatus of claim 1, wherein the first field is a frame body (FB) field.

11. The apparatus of claim 1, wherein the second field is a frame control (FC) field.

12. A method for wireless communications by an apparatus, comprising:
    obtaining a frame lacking a first field that carries data and having at least a second field comprising one or more subfields;
    performing an integrity check of the frame based on a comparison of an integrity check value obtained in the frame and an integrity check value calculated by the apparatus based, at least in part, on the one or more subfields; and
    discarding the frame if the integrity check fails.

13. The method of claim 12, wherein the frame comprises a request frame, the method further comprising outputting a response frame for transmission in response to the request frame if the integrity check succeeds.

14. The method of claim 13, wherein the request frame comprises a media access control (MAC) protocol data unit (MPDU).

15. The method of claim 14, wherein:
    the second field is a frame control (FC) field; and
    the MPDU comprises the FC field, one or more address fields, a sequence control (SC) field, and a message integrity check (MIC) field.

16. The method of claim 15, wherein the MIC field has a MIC value based, at least in part, on at least one of the one or more subfields, the one or more address fields, or the SC field.

17. The method of claim 13, wherein the request frame comprises a frame body (FB) field that conveys control information.

18. The method of claim 13, wherein the response frame comprises a media access control (MAC) protocol data unit (MPDU) that lacks a field that contains data, and comprises a FC field including the one or more subfields, a sequence control (SC) field, an integrity check value, and a frame check sequence (FCS).

19. The method of claim 12, wherein the first field is a frame body (FB) field and the second field is a frame control (FC) field.

20. A station for wireless communications, comprising:
    a receiver configured to receive a frame lacking a first field that carries data and having at least a second field comprising one or more subfields; and
    a processing system configured to:
    perform an integrity check of the frame based on a comparison of an integrity check value received in the frame and an integrity check value calculated by the station based, at least in part, on the one or more subfields; and
    discard the frame if the integrity check fails.

* * * * *